Inventors
George Roland Gahagan
William Shaw
By Cushman, Darby & Cushman
Attorneys

United States Patent Office 3,266,734
Patented August 16, 1966

3,266,734
THRUST REVERSERS FOR JET PROPULSION ENGINES
George Roland Gahagan, Linby, and William Shaw, Derby, England, assignors to Rolls-Royce Limited, Derby, England, a company of Great Britain
Filed Jan. 28, 1965, Ser. No. 428,805
Claims priority, application Great Britain, Feb. 3, 1964, 4,578
4 Claims. (Cl. 239—265.29)

This invention concerns thrust reverser assemblies for jet propulsion engines.

According to the present invention there is provided a thrust reverser assembly for a jet propulsion engine which includes a jet pipe surrounded by an engine pod, said thrust reverser being accommodated within said jet pipe and pod and comprising first and second gas deflector members movable between a first position, in which they merge with an form part of, said jet pipe and pod respectively, and a second position in which they prevent passage of gases through said jet pipe and direct the gases through apertures in the walls of said jet pipe and pod to atmosphere.

Preferably means are provided for simultaneously moving said first and second gas deflector members between said first and second positions.

There may be two first and second gas deflector members disposed diametrically opposite one another. The first and second gas deflector members may be pivotally mounted about parallel pivots disposed at right angles to the axis of said jet pipe, said two first gas deflector members being mounted about common pivots.

Preferably said first and second gas deflector members are interconnected whereby they move together. Thus, in a preferred embodiment, each said first gas deflector member is connected to the second gas deflector member disposed at the opposite side of said jet pipe.

The second gas deflector member may be substantially semi-cylindrical chutes, pivotally mounted within apertures in said pod, the chutes being so shaped and mounted that their longitudinal edges are always disposed within said pod, even during movement between said first and second positions, whereby side-leakage of exhaust gases which are directed to atmosphere through said chutes, is reduced. The gas deflector members are preferably disposed at the uppermost and lowermost portion of said jet pipe and pod. The second gas deflector member disposed at the lowermost portion of said pod, preferably has one side of its semi-cylindrical wall removed, and has its end at least partially blocked, whereby exhaust gases passing therethrough are directed through said one side to atmosphere.

The invention also includes a jet propulsion engine provided with a thrust reverser assembly as set forth above.

Figure 1:
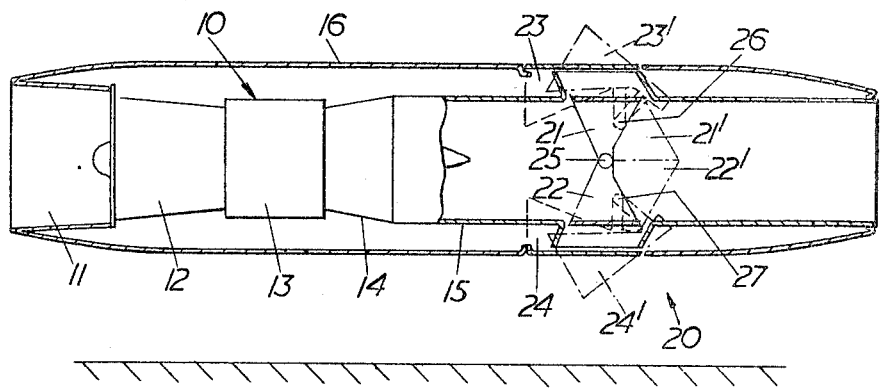
Figure 2:
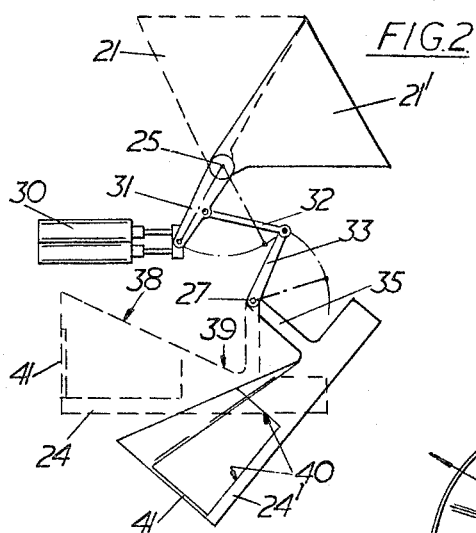
Figure 3:
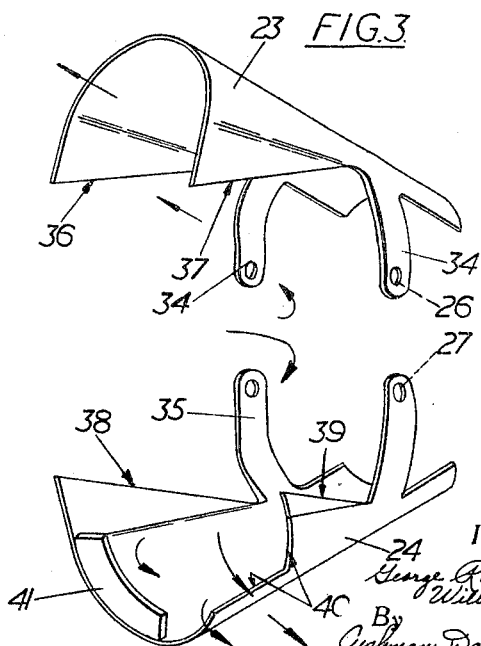

The invention is illustrated, merely by way of example, in the accompanying drawings, in which:

FIGURE 1 is a part sectional elevation of a jet propulsion engine provided with a thrust reverser assembly in accordance with the present invention, and FIGURES 2 and 3 are more detailed views of components of the assembly shown in FIGURE 1.

Referring to the drawings, a gas turbine jet propulsion engine 10 comprises an intake 11, compressor 12, combustion equipment 13, turbine equipment 14 and jet pipe 15. The engine 10 is disposed with a pod 16.

A thrust reverser 20 is provided in jet pipe 15. The thrust reverser comprises two first gas deflectors 21, 22, and two second gas deflectors 23, 24. Gas deflectors 21 and 22 are pivotally mounted on common pivots 25 and are movable between a first position, shown in full lines in FIGURE 1, in which they merge with and form part of jet pipe 15, and a second position 21', 22', shown in broken lines in FIGURE 1, in which they co-operate to block the jet pipe 15, leaving apertures in the wall of the jet pipe through which they direct exhaust gases impinging on them.

Gas deflectors 23, 24 are pivotally mounted about pivots 26, 27 between a first position, shown in full lines in FIGURE 1, in which they merge with and form part of the pod 16 and a second position 23', 24' shown in broken lines in FIGURE 1, in which they leave apertures in pod 16 and form continuations of deflectors 21', 22', directing exhaust gases to atmosphere.

To move the deflectors 21, 22 and 23, 24 simultaneously between their two positions, devices such as that shown in detail in FIGURE 2 may be used. A ram 30 is pivotally connected to one end of an arm 31, rigidly attached at its other end to gas deflector 21. Pivoted to the centre of arm 31 is one end of a lever 32, the other end of which is pivoted to a lever 33, itself pivotally mounted on pivot 27. The lever 33 is rigidly attached to an extension 35 of gas deflector 24. It will be appreciated that, upon movement of the ram 30 to the right (as seen in FIGURE 2) the gas deflectors 21, 24, will simultaneously move from the the full line positions shown at 21', 24' to the broken line positions shown at 21, 24. A similar arrangement is also used for interconnecting gas deflectors 22 and 23, the systems being controlled together whereby all four gas deflectors move simultaneously.

As seen in FIGURES 2 and 3 the gas deflectors 23, 24 are substantially semi-cylindrical chutes having extensions 34, 35 respectively by which they are pivotally mounted on pivots 26, 27 respectively. As clearly seen in these figures, the deflectors are not truly semi-cylindrical and they are provided with sloping longitudinal edges 36, 37 and 38, 39 respectively. By so forming the longitudinal edges, these edges remain within the apertures formed in pod 16 even when deflectors 23, 24 are in their extended or second position indicated at 23', 24'. This is shown in FIGURE 1. Since edges 36, 37, 38 and 39 are within pod 16 at all times, side-leakage of exhaust gases is reduced.

Gas deflector 24 is disposed close to the ground when installed in an aircraft. Consequently there is a danger of dirt and stones etc. being disturbed and lifted off the ground when the thrust reverser is in use, and the disturbed particles may be ingested into the intake 11, causing damage to compressor 12. To prevent particles being blown directly forward of the engine, gas deflector 24 is cut away, as at 40, to provide a side exit for the exhaust gases flowing through gas deflector 24. The end of the chute is also partially blocked by a block 41, thereby causing the exhaust gases to be deflected into the side exit. Thus exhaust gases are prevented from passing directly forwardly of the engine.

We claim:

1. In a jet propulsion engine which includes an apertured jet pipe and an apertured engine pod surrounding the jet pipe, a thrust reverser assembly accommodated within said jet pipe and pod and comprising two first and two second gas deflector members disposed in pairs at the uppermost and lowermost portions of the jet pipe and pod and movable between first positions, in which they merge with and form part of said jet pipe and pod respectively, blocking said apertures, and second positions in which they prevent passage of gases through said jet pipe and direct the gases through said apertures to atmosphere, the second gas deflector member disposed at the lowermost portion of said pod being a substantially semi-cylindrical chute having one side of its semi-cylindrical wall removed, and having its end at least partially blocked, whereby exhaust gases passing therethrough are directed through said one side to atmosphere.

2. An assembly as claimed in claim 1 including means interconnecting said members whereby they move together between said first positions and said second positions.

3. An assembly as claimed in claim 1 and including means interconnecting each said first gas deflector member to the second gas deflector member disposed at the opposite side of the jet pipe whereby said members are movable together between said first positions and said second positions.

4. An assembly as claimed in claim 1 wherein both said second gas deflector members are substantially semi-cylindrical chutes, pivotally mounted within said apertures in said pod, said chutes being so shaped and mounted that their longitudinal edges are always disposed within said pod, even during movement between said first and second positions, whereby side-leakage of exhaust gases which are directed to atmosphere through said chutes, is reduced.

References Cited by the Examiner

UNITED STATES PATENTS

| | | | |
|---|---|---|---|
| 2,510,506 | 6/1950 | Lindhagen et al. | 60—35.54 |
| 2,620,622 | 12/1952 | Lundberg | 60—35.55 |
| 2,847,823 | 8/1958 | Brewer | 60—35.54 |
| 3,002,342 | 10/1961 | Schatzki | 60—35.54 |
| 3,018,620 | 1/1962 | Meyer | 60—35.54 |
| 3,068,646 | 12/1962 | Fletcher | 60—35.54 X |
| 3,106,372 | 10/1963 | Kutney | 60—35.54 X |

MARK NEWMAN, *Primary Examiner.*

A. L. SMITH, *Assistant Examiner.*